United States Patent [19]

Costa

[11] Patent Number: 5,362,416
[45] Date of Patent: Nov. 8, 1994

[54] SUSPENSIONS OF PARTICLES CONTAINING TRANSITION METAL COMPOUNDS IN OILS

[75] Inventor: Jean-Louis Costa, Grimbergen,

[73] Assignee: Solvay & Cie (Société Anonyme), Brussels,

[21] Appl. No.: 979,413

[22] Filed: Nov. 19, 1992

Related U.S. Application Data

[63] Continuation of Ser. No. 529,358, May 29, 1990, abandoned.

[30] Foreign Application Priority Data

May 29, 1989 [FR] France .................... 89 07141

[51] Int. Cl.$^5$ .................. B01J 13/00; C08F 4/642; C08F 10/00
[52] U.S. Cl. .................. 252/309; 252/308; 502/103; 502/158; 502/169; 526/128; 526/142; 526/903
[58] Field of Search ............ 502/169, 158; 252/308, 252/309

[56] References Cited

U.S. PATENT DOCUMENTS

| | | | |
|---|---|---|---|
| 2,967,834 | 1/1961 | Daniel et al. | 526/351 |
| 2,974,133 | 3/1961 | Wiberg et al. | 502/158 |
| 3,085,999 | 4/1963 | Tung | 526/129 |
| 3,227,702 | 1/1966 | Small et al. | 502/158 |
| 3,361,681 | 1/1968 | Muller . | |
| 3,484,426 | 12/1969 | Stadiowiala et al. . | |
| 4,081,589 | 3/1978 | Peters et al. | 526/129 |
| 4,183,824 | 1/1980 | Shiga et al. . | |
| 4,210,729 | 7/1980 | Hermans et al. . | |
| 4,210,738 | 7/1980 | Hermans et al. . | |
| 4,295,991 | 10/1981 | Wristers . | |
| 4,311,817 | 1/1982 | Morita et al. | 526/908 |
| 4,347,158 | 8/1982 | Kaus et al. | 252/429 B |
| 4,368,304 | 1/1983 | Sato et al. . | |
| 4,555,496 | 11/1985 | Agapiou et al. | 502/105 |
| 4,579,836 | 4/1986 | Arzoumanidis et al. | 526/904 |
| 4,847,340 | 7/1989 | Allen et al. | 526/125 |

FOREIGN PATENT DOCUMENTS

| | | |
|---|---|---|
| 0065700 | 11/1982 | European Pat. Off. . |
| 143002 | 5/1985 | European Pat. Off. . |
| 0143002 | 5/1985 | European Pat. Off. . |
| 261727 | 3/1988 | European Pat. Off. . |
| 0261727 | 3/1988 | European Pat. Off. . |
| 1433944 | 2/1966 | France . |
| 1008221 | 10/1965 | United Kingdom . |
| 1040669 | 9/1966 | United Kingdom ........ 526/902 |

OTHER PUBLICATIONS

Kirk–Othmer, Encyclopedia of Chemical Technology, 3rd Ed, vol. 20, John Wiley & Sons, N.Y., (1982), pp. 778–779.

Boor, Ziegler. Natta Catalysts and Polymerizations, Academic Press, N.Y., (1979), 602–609.

*Primary Examiner*—Edward J. Smith
*Attorney, Agent, or Firm*—Spencer, Frank & Schneider

[57] ABSTRACT

Suspensions, in oils, of particles containing a transition metal compound, which are spheroidal and of narrow particle size distribution.

These suspensions can be employed in processes for the polymerization of alpha-olefins, carried out in the presence of an organoaluminium activator.

13 Claims, No Drawings

SUSPENSIONS OF PARTICLES CONTAINING TRANSITION METAL COMPOUNDS IN OILS

This application is a continuation of application Ser. No. 07/529,358, filed May 29th, 1990 now abandoned.

BACKGROUND OF THE INVENTION

1. Field of the Invention

The present invention relates to suspensions of particles containing transition metal compounds in oils. It also relates to processes for the polymerization of alpha-olefins carried out in the presence of these suspensions.

2. Background of the Related Art

Many recent processes for the manufacture of particles containing solid transition metal compounds (titanium halides, supported or otherwise, etc.), which can be employed for the polymerization of olefins give rise to fine powders of very uniform morphology (microspheres of very narrow particle size distribution). Such morphology offers advantages, not only because the transport and the storage of these particles are made easier, but also because this morphology facilitates the direction and the control of the polymerizations carried out in their presence.

In practice, hitherto, these particles have been handled, packaged and employed either in the form of suspensions in inert hydrocarbon diluents, preferably the diluents which may be employed for the subsequent polymerization, or in the form of dry particles.

It is true that in patent FR-A-1,433,944 (The Goodyear Tire & Rubber Company) there is also a description of "suspensoid" compositions of solid transition metal salts, which can be employed as catalyst components for stereospecific polymerization of olefins, in "semisolid" or viscous hydrocarbons which protect them from certain contaminating factors such as air and water in the course of their handling, packaging, transport and use. These compositions prevent the deposition of certain constituents of the catalyst, provide a more homogeneous system and simplify the measuring out of the constituents. In practice however, the dimensions of the particles of these salts are relatively large (between 175 and 74 $\mu$m); according to the examples, suspensions of titanium tetraiodide crystals in liquid paraffin are manufactured. The patent provides no indication as to the particle size distribution of the particles.

SUMMARY OF THE INVENTION

Now, it has now been found that the microspheres of very narrow particle size distribution which are described above can, contrary to all expectations, give rise to very stable suspensions in oils. This discovery assumes an unexpected nature because one could not reasonably foresee that fine particles exhibiting such uniform morphology would not settle quickly in oils.

The present invention consequently relates to suspensions of particles containing a transition metal compound (T) in an oil, these particles being spheroidal and of narrow particle size distribution.

DETAILED DESCRIPTION OF THE PREFERRED EMBODIMENTS

The particles suspended in an oil in accordance with the invention contain a transition metal compound (T). This compound may be the main constituent of the particles or may represent merely a part, even a minor one, of the total chemical composition of the said particles.

The compound (T) is generally chosen from compounds of metals of groups IVa to VIa of the Periodic Table of the Elements (version published in the Kirk-Othmer Encyclopedia of Chemical Technology, 2nd edition, vol. 8, page 94, 1965); it is often chosen from titanium compounds, preferably from the halogen compounds and very particularly from the chlorine compounds of this metal.

The particles containing a compound (T) according to the invention are generally the solid constituent of the olefin polymerization catalysts belonging to the class known to the specialist by the name of Ziegler-Natta catalysts.

Examples of particles in which the compound (T) accounts for only a part of the chemical composition are particles of so-called "supported" Ziegler-Natta catalysts. The support of the compound (T) is generally inorganic in nature. It often contains magnesium halides, in particular magnesium chlorides whose X-ray diffraction spectrum differs from the normal spectrum of this compound.

Both the support and the compound (T) may be associated with or contain electron-donor compounds, in particular esters.

Particles of supported catalyst of the Ziegler-Natta type which are spheroidal and of narrow particle size distribution and which can therefore be suspended in an oil according to the invention are described, for example and without any limitation, in patents EP-B-0,065,700 (ENICHEM ANIC) and 0,143,002 (BP Chemicals).

Examples of particles in which the compound (T) is the main constituent are particles based on solid halides of metals of groups IVa to VIa.

This typically involves particles of which more than 50% of the total weight and frequently more than 60% of the total weight consists of solid titanium halide. This halide is preferably titanium trichloride, most particularly titanium trichloride complexed with an electron-donor compound. The latter is preferably chosen from aliphatic ethers, in particular those whose aliphatic radicals contain from 2 to 8 carbon atoms.

Particles containing titanium trichloride complexed with an electron-donor compound (called complexed titanium trichloride hereinafter) exhibiting a spheroidal shape and narrow particle size distribution can be obtained by known processes involving an initial reduction of titanium tetrachloride or a titanium tetraalkoxide with a reducing agent comprising an alkylaluminium, preferably a chlorinated alkylaluminium. The reduced solid thus obtained is then subjected to a treatment of complexing by means of an electron-donor compound, preferably combined with or followed by a treatment of activation with an agent chosen from inorganic and organic halogen compounds, interhalogen compounds and halogens.

These initial reduction stages and these treatments of complexing and activating the reduced solid are well known and have been extensively described in the literature. Details concerning the operating conditions of these stages and treatments can be found especially in patents BE-A-780,758 (Solvay & Cie), BE-A-864,708 (Sumitomo Chemical Company Ltd), U.S. Pat. No. 4,368,304 (Chisso Corporation) and U.S. Pat. No. 4,295,991 (Exxon Research and Engineering Co.) and in the documents cited in the latter.

For performing these reduction stages, these complexing treatments and these activation treatments, the starting compound is preferably titanium tetrachloride. The reducing agent is preferably chosen from dialkylaluminium chlorides and alkylaluminium sesquichlorides in which the alkyl chains contain from 2 to 6 carbon atoms, and is optionally complexed with an aliphatic ether such as those defined above. The electron-donor compound employed for the complexing treatment is also preferably chosen from these ethers.

As for the activating agent, this is preferably chosen from titanium tetrachloride, iodine and chlorinated alkanes containing from 2 to 8 carbon atoms and from 2 to 6 chlorine atoms per molecule.

A very particularly preferred reducing agent is diethylaluminium chloride. Very particularly preferred electron-donor compounds are diisoamyl and di-n-butyl ethers. A very particularly preferred activating agent is titanium tetrachloride.

At any time of their preparation, but preferably after the activation treatment—where the latter is carried out—the particles containing complexed titanium trichloride may be subjected to an additional activation treatment which consists in bringing them into contact with an activating agent chosen from organoaluminium compounds and products of the reaction of an organoaluminium compound with a compound chosen from hydroxyaromatic compounds in which the hydroxyl group is stearically hindered. The organoaluminium compound is preferably chosen from trialkylaluminiums and alkylaluminium chlorides. Among these compounds the best results have been obtained with diethylaluminium chloride. The hydroxyaromatic compound whose hydroxyl group is stearically hindered is generally chosen from mono- or polycyclic hydroxyarylenes substituted by a secondary or tertiary alkyl radical in the two ortho positions relative to the hydroxyl group and, preferably, from phenols which are di-tert-alkylated in the ortho positions relative to the hydroxyl groups and the esters of 3-(3',5'-di-tert-butyl-4'-hydroxyphenyl)propionic acid. Among these compounds the best results have been obtained with n-octadecyl 3-(3',5'-di-tert-butyl-4'-hydroxyphenyl)propionate and with 2,6-di-tert-butyl-4-methylphenol.

Other details concerning the additional activation treatment defined above, especially concerning the nature of the organoaluminium and hydroxyaromatic compounds, with the operating conditions in which this treatment is carried out and with the texture of the particles obtained, will be found in patents BE-A-803,875 and FR-A-2,604,439 (Solvay & Cie).

In addition, at any time of their preparation, after the reduction stage or the complexing treatment, or after the optional activation treatments, but preferably after the reduction stage, the particles may be subjected to a treatment aimed at decreasing their friability. This treatment, called "prepolymerization", consists in bringing the solid into contact with a lower alpha-monoolefin such as ethylene or, better, propylene in polymerizing conditions so as to obtain a solid generally containing approximately from 5 to 500% by weight of "prepolymerized" alpha-monoolefin.

The stages and treatments described above may all be carried out in the presence of an inert hydrocarbon diluent, generally chosen from liquid aliphatic, cycloaliphatic and aromatic hydrocarbons such as liquid alkanes and isoalkanes and benzene.

The particles containing complexed titanium trichloride exhibiting a spheroidal form and a narrow particle size distribution whose suspension in an oil according to the invention produces the best results are those resulting from the preferred method of preparation described in patent FR-A-2,604,439. These particles result from the additional treatment of activation of precursors, the preferred method of preparation of which is, in its turn, described in patent BE-A-780,758, and which besides, like the particles resulting from the additional activation treatment, are in the form of spherical particles which generally have a diameter of between 5 and 100 microns, in most cases between 10 and 50 microns, very particularly between 15 and 40 microns. They consist of an agglomerate of microparticles which are also spherical and which have a diameter of between 0.05 and 1 micron, in most cases between 0.1 and 0.3 microns, and which are extremely porous. As a result, the particles have a specific surface greater than 75 m$^2$/g and lying in most cases between 100 and 250 m$^2$/g and a total porosity greater than 0.15 cm$^3$/g and in most cases between 0.20 and 0.35 cm$^3$/g. The internal porosity of the microparticles forms the largest contribution to this total porosity of the particles, as witnessed by the high value of the pore volume corresponding to the pores of less than 200 Å in diameter, which is greater than 0.11 cm$^3$/g and in most cases between 0.16 and 0.31 cm$^3$/g. These particulars of precursors obtained according to the method of preparation described in patent BE-A-780,758, the preferred operating conditions being chosen, correspond to the formula:

$$TiCl_3 \cdot (AlRCl_2)_x \cdot C_y$$

where R is an alkyl radical containing from 2 to 6 carbon atoms, C is an electron-donor compound such as defined above, x is any number smaller than 0.20 and y is any number larger than 0.009 and generally smaller than 0.20.

This formula does not take into account the possible layer of "prepolymerized" alpha-olefin coating the precursor particles as a result of the "prepolymerization" carried out, preferably, on the reduced solid.

In all cases, the particle size distribution of the particles suspended in an oil according to the invention is narrow and these particles are spheroidal.

"Spheroidal particles" is intended to refer to particles whose shape is as close as possible to the shape of a sphere. This shape can be expressed by the ratio D/d in which D and d represent the major axis and the minor axis of these particles respectively. This ratio is generally lower than 2, preferably lower than 1.5. The best results have been obtained with particles whose D/d ratio is equal to or lower than 1.3.

The particle size distribution of the particles can be expressed by the polydispersity ratio $D_w/D_n$, in which: $D_n$ is the number-average diameter defined by the ratio $$D_n = \frac{\Sigma n_i D_i}{\Sigma n_i}$$

and
$D_w$ is the weight-average diameter defined by the ratio $$D_w = \frac{\Sigma\, n_i D_i^4}{\Sigma\, n_i D_i^3}$$

where $n_i$ denotes the number of particles of diameter $D_i$; $D_n$ and $D_w$ can be determined according to the known methods described by E. A. Collins, J. A. Davidson and C. A. Daniels in "Review of Common Methods of Particle Size Measurement", Journal of Paint Technology, volume 47, no. 604, May 1975 or using the image analysis method whose principle is described in patent EP-B-0,143,002, page 5, lines 51 to page 6, line 12.

The particle size distribution of the particles suspended in an oil according to the invention is generally narrowed to the point where the ratio $D_w/D_n$ is lower than 3. This ratio of preferably lower than 2.

In the case of particles containing complexed titanium trichloride the suspension of which in oils has produced the best results (see above), this ratio is often lower than 1.5 and, in the best cases, between 1 and 1.2, the particles being practically monodisperse.

The oils in which the particles containing a compound (T) are suspended according to the invention are generally chosen from mineral oils and silicone oils.

Mineral oils are intended to refer to all the viscous products which are liquid at ordinary temperature and which are mineral in origin.

These oils may be, for example, light, intermediate or heavy oils originating from the distillation of coal tars or else oils obtained in the course of the fractional distillation of petroleum. These last are preferred and, among these, the so-called "mineral" oils which are mixtures of tetracarbons distilling approximately from 225° to 400° C.

Silicone oils are intended to refer to fluids containing a compound which corresponds to the formula:

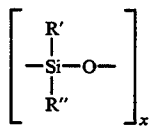

in which R' and R" are identical or different and denote a radical chosen from alkyl and alkoxy radicals containing from 1 to 5 carbon atoms and aryl and aryloxy radicals, and in which x between 3 and 2000; R' and R" are preferably identical and are methyl or phenyl radicals, and x is between 3 and 100.

Excellent results have been recorded with the commercial compounds called "dimethylsilicone fluids" or "methylpolysiloxanes", the difference being of no consequence, in the composition of which R' and R" denote a methyl radical, more especially with the silicone oils marketed, for-example, by Rhône-Poulenc under the names "Rhodorsil Oils 47", by Dow Corning under the names "fluids no. 200" and by General Electric under the names "GE silicone oils".

All these oils are generally characterized by kinematic viscosities of between approximately 0.5 and approximately 30,000 cSt (centistokes) ($5 \times 10^{-6}$ to $3 \times 10^{-2}\, m^2/s$), preferably between approximately 2 and approximately 3,000 cSt ($2 \times 10^{-5}$ to $3 \times 10^{-1}\, m^2/s$).

The particles containing a compound (T) are introduced into the oil in such quantity that they generally represent between 5 and 90% of the total weight of the suspension, preferably 20 and 70% of this total weight.

Very stable suspensions are obtained when the particles constitute from 25 to 50% of the total weight of the suspension.

As a result of their most common method of preparation (see above), the particles to be suspended in the oil according to the invention often are in the form of a suspension in an inert hydrocarbon diluent. This diluent can be removed according to any known method: by filtration, decanting, evaporation, etc. It can also be entrained by an inert gas stream which is circulated through the hydrocarbon suspension, to which the required quantity of oil has been added.

According to an advantageous embodiment of the invention, a thickening agent may also be added to the oil. This thickening agent is generally based on silica, preferably colloidal silica. Colloidal silicas marketed for the purpose of performing this function of thickening are suitable. These are, for example, products marketed by Degussa under the name "Aerosil". This thickening agent is generally added to the suspension in a proportion of more than 1% by weight relative to the weight of particles, preferably in a proportion of 2 to 15% by weight. It has been found that, in these conditions, the addition of colloidal silica to the suspension enables the rate of settling of the particles to be decreased appreciably, which was predictable, but also has the effect of reducing, to a degree which is often considerable, their apparent specific weight after decanting, which is unexpected.

In another of its aspects, the invention also relates to a process for polymerizing alpha-olefins in the presence of the particle suspensions described above.

These suspensions can in fact be employed, together with a conventional organoaluminium activator, to catalyse the polymerization of alpha-monoolefins whose molecule contains from 2 to 18 and preferably 2 to 6 carbon atoms, such as ethylene, propylene, 1-butene, 1-pentene, 1-hexene, 3- and 4-methyl-1-pentene and vinylcyclohexene. They are preferably employed for the stereospecific polymerization of propylene, of 1-butene and of 4-methyl-1-pentene to crystalline, highly isotactic polymers.

They are also employed for the copolymerization of these alpha-olefins with each other and with diolefins containing from 4 to 18 carbon atoms. The diolefins are preferably unconjugated aliphatic diolefins such as 1,4-hexadiene, unconjugated monocyclic diolefins such as 4-vinylcyclohexene, alicyclic diolefins which have an endocyclic bridge, such as dicyclopentadiene, methylene- and ethylenenorbornene and conjugated aliphatic diolefins such as butadiene and isoprene.

They are also employed for the manufacture of so-called block copolymers, which are made up from alpha-olefins and diolefins. These block copolymers consist of successions of chain segments of variable lengths; each segment consists of a homopolymer of an alpha-olefin or of a random polymer containing one alpha-olefin and at least one comonomer chosen from alpha-olefins and diolefins. The alpha-olefins and the diolefins are chosen from those mentioned above.

Catalyst systems comprising the suspensions defined above and an organoaluminium activator are particularly suitable for the manufacture of propylene homopolymers and of copolymers containing in all at least 50% by weight of propylene and preferably 75% by weight of propylene.

The organoaluminium activator is preferably chosen from the compounds of formula:

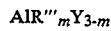

where
R''' is a hydrocarbon radical containing from 1 to 18 carbon atoms and preferably from 1 to 12 carbon atoms chosen from alkyl, aryl, arylalkyl, alkylaryl and cycloalkyl radicals; the best results are obtained when R''' is chosen from alkyl radicals containing from 2 to 6 carbon atoms;
Y is a halogen chosen from fluorine, chlorine, bromine and iodine; the best results are obtained when Y is chlorine;
m is any number such that $0<m\leq 3$ and preferably such that $1.5\leq m\leq 2.5$; the best results are obtained when m is equal to 2.

In a particularly preferred manner, diethylaluminium chloride (DEAC) is the essential constituent of the organoaluminium activator, because it ensures the maximum activity and stereospecificity of the catalyst system.

The polymerization may be carried out according to any known process: in solution or in suspension in an inert hydrocarbon solvent or diluent, such as those defined in relation to the preparation of the particles, and which is preferably chosen from butane, pentane, hexane, heptane, cyclohexane, methylcyclohexane or their mixtures. The polymerization may also be performed in the monomer or one of the monomers, which is kept in the liquid state or in a gaseous phase. The introduction into the polymerization medium of the particles containing a compound (T) in suspension in an oil according to the invention offers a series of advantages: by virtue of the reduced settling rates of the particles in the suspensions according to the invention the deposition of particles in the devices intended to introduce them into the polymerization medium (storage vessels, pipes, valves, etc.) is avoided with its disadvantages such as buildups and blockages, local hot spots, heterogeneity of concentration and heterogeneity of the properties of the polymers obtained.

The polymerization temperature is generally chosen between 20° and 200° C. and preferably between 50° and 90° C., the best results being obtained between 65° and 85° C. The pressure is generally chosen between atmospheric pressure and 80 atmospheres and preferably between 10 and 50 atmospheres. This pressure is obviously a function of the temperature employed.

The polymerization may be carried out continuously or noncontinuously.

The organometallic compound and the particle suspension may be added separately to the polymerization medium. They may also be brought into contact, at a temperature of between −40° and 80° C., for a time which depends on this temperature and which may range from a few seconds to several hours, before they are introduced into the polymerization reactor.

The total quantity of organometallic compound used is not critical; it is generally greater than 0.1 mmol per liter of diluent, of liquid monomer or of reactor volume, preferably greater than 0.5 mmol per liter.

The particle suspension used is determined as a function of its content of compound (T). It is generally chosen so that the concentration of the polymerization medium is higher than 0.01 mmol of compound (T) per liter of diluent, of liquid monomer or of reactor volume, and preferably higher than 0.05 mmol per liter.

The ratio of the quantities of organometallic compound and of preactivated catalytic solid is not critical either. It is generally chosen so that the molar ratio of organometallic compound to $TiCl_3$ present in the solid is between 0.5 and 20 and preferably between 1 and 15. The best results are obtained when the molar ratio is between 2 and 12.

At comparable composition and concentration of compound (T), the suspensions of particles containing compounds (T) generally have the same behaviour in polymerization as their homologues in suspension in a conventional hydrocarbon diluent or as the corresponding dried particles.

An improvement in the catalytic activity of the order of approximately 15% has been found, however, when the oil employed to suspend the particles is a silicone oil.

The following examples are used to illustrate the invention.

EXAMPLES 1 TO 3

Example 1 is given by way of comparison.

A. Preparation of the Particles Containing a Compound (T)

These particles are prepared as shown in Example 4 of patent FR-A-2,604,439.

After the decanting ending this preparation, the particles of the solid obtained, which are spheroidal (D/d ratio=1.19), are subjected to a determination of particle size distribution using the image analysis method, which leads to the following results:

$D_n = 25.8$ μm
$D_w = 26.7$ μm
$D_w/D_n = 1.03$.

These particles are resuspended (40% by weight) in hexane. This suspension is called suspension C hereinafter.

B. Preparation of Suspensions of Particles in Oils

To a first part of this suspension C there is added 100% by weight, relative to hexane, of a mineral oil of 31 cSt kinematic viscosity (25° C.) (Blandol White Mineral Oil product of Union Carbide).

To a second part of this suspension C there is added 100% by weight, relative to hexane, of a silicone oil of 50 cSt kinematic viscosity (25° C.), marketed by Rhône-Poulenc under the name "Rhodorsil 47 V50 oil".

Hexane is progressively stripped from the last two suspensions mentioned in a device consisting of a 1—1 autoclave thermostatically controlled at 40° C. and fitted with a bottom valve through which dry nitrogen is injected into the suspension at a rate of 50 l/h at 25° C., with stirring (150 rev/min).

The entrained hexane is recovered in a coil condenser immersed in a bath cooled to −78° C.

The suspension of particles in the mineral oil is called suspension A hereinafter.

The suspension of particles in the silicone oil is called suspension B hereinafter.

The relative settling rates of the particles in the suspensions A and B relative to those of the particles suspended in hexane (suspension C) were measured by experiment. These measurements were performed by scrutinizing the liquid-solid interface in the course of time: the absolute rates were calculated on the basis of the angular coefficient of the right-hand part of the experimental curve obtained and the relative rates were estimated using the quotient of the absolute rates measured in hexane and in the oil in question.

The results are recorded in Table I below.

TABLE I

| Example | 1 | 2 | 3 |
|---|---|---|---|
| Suspension | C | A | B |
| Nature of the suspension medium | hexane | mineral oil | silicone oil |
| Relative rate of settling | 1 | 105 | 370 |
| Apparent density (AD) of the particles (g/l) | 756 | 752 | 784 |

A much slower (105 and 370 times respectively) relative rate of settling of the particles of suspensions A and B is therefore found without appreciable modification in their AD.

EXAMPLE 4

5% by weight (relative to the weight of particles containing the compound (T)) of a colloidal silica marketed by Degussa under the name Aerosil 200 is added to suspension A.

The relative settling rate is slowed down 5.5-fold again. In addition, the AD of the particles containing the compound (T) decreases from 752 to 472 g/l, which makes them appreciably easier to resuspend.

EXAMPLES 5 TO 9

Example 5 is given by way of comparison.

These examples are intended to demonstrate the behaviour, in propylene polymerization, of suspensions A and B (1) defined in Examples 2 and 3, relative to suspension C (for comparison).

(1) The silicone oil employed has a kinematic viscosity of 2 cSt (Rhône-Poulenc Rhodorsil 47 V2 oil).

The following are introduced under nitrogen purging into a 5-1 autoclave dried beforehand and kept under a dry nitrogen atmosphere:

3.2 mmol of DEAC (in the form of a solution of a concentration of 80 g/l in hexane);
a quantity of suspension equivalent to approximately 100 mg of particles containing the compound (T);
hydrogen under a partial pressure of 1 bar;
3 l of liquid propylene.

The reaction is maintained at 70° C. with stirring for 3 hours. The excess propylene is then degassed and the polypropylene (PP) formed is recovered.

The results of the polymerization tests are collected in Table II below.

TABLE II

| Example | 5 | 6 | 7 | 8 | 9 |
|---|---|---|---|---|---|
| Suspension employed | C | A | A with the addition of 5% by weight of colloidal silica (1) | B | B with the addition of 5% by weight of colloidal silica (1) |
| Catalytic activity (g PP/g TiCl3 contained in the particles × h) | 4704 | 4814 | 4928 | 5447 | 5750 |
| Fraction of the PP insoluble in boiling heptane (% of the total quantity of solid polymer collected) | 96.8 | 96.9 | 96.9 | 96.1 | 95.6 |
| AD of the PP (g/l) | 523 | 520 | 512 | 520 | 518 |
| Melt flow index (MFI) of the PP standard D 1238; 2.16 kg - 230° C.) | 14.7 | 5.9 | 14.6 | 9.4 | 14.3 |

(1) See Example 4

The beneficial effect on the catalytic activity of the introduction of the particles into the polymerization medium in the form of a suspension in a silicone oil is observed, especially when silica is added to the latter.

I claim:

1. A suspension of particles containing titanium trichloride complexed with an electron-donor compound in at least one silicone oil which is a fluid, said particles representing from 25 to 50% of the total weight of the suspension, having a major axis (D), a minor axis (d), and a ratio of D/d which is less than 2 so that said particles are spheroidal, and having a weight-average diameter ($D_w$), a number-average diameter ($D_n$), and a ratio of $D_w/D_n$ which is less than 3 so that said particles have a narrow particle size distribution.

2. The suspension according to claim 1, wherein the particles have a diameter ranging from between about 10 to about 50 microns.

3. The suspension according to claim 1, wherein the particles result from a treatment of activation, using a product of a reaction of an organoaluminium compound with a hydroxyaromatic compound in which the hydroxyl group is stearically hindered, of a precursor whose composition corresponds to the formula:

$$TiCl_3.(AlRCl_2)_x.C_y$$

where R is an alkyl radical containing from 2 to 6 carbon atoms, C is an electron-donor compound such as defined above, x is any number smaller than 0.20 and y is any number larger than 0.009 and generally smaller than 0.20.

4. The suspension according to claim 3, wherein the particles are subjected to a prepolymerization treatment at any time during their preparation by contacting them with a lower alpha-monoolefin under polymerizing conditions to obtain particles containing from about 5 to about 500% by weight of prepolymerized alpha-monoolefin.

5. The suspension according to claim 1, wherein the oil has a kinematic viscosity (25° C.) ranging between about 0.5 to about 30,000 cSt.

6. The suspension according to claim 5, wherein the oil has a kinematic viscosity (25° C.) ranging between about 2 to about 3,000 cSt.

7. A suspension of particles containing titanium trichloride complexed with an electron-donor compound and colloidal silica in a proportion of about 2 to 15% by weight relative to the weight of the particles in at least one silicone oil which is a fluid, said particles having a major axis (D), a minor axis (d), and a ratio of D/d which is less than 2 so that said particles are spheroidal, and having a weight-average diameter ($D_w$), a number-average diameter ($D_n$), and a ratio of $D_w/D_n$ which is less than 3 so that said particles have a narrow size distribution.

8. The suspension according to claim 7, wherein the particles have a diameter ranging from between about 10 to about 50 microns.

9. The suspension according to claim 7, wherein the particles result from a treatment of activation, using a product of a reaction of an organoaluminium compound with a hydroxyaromatic compound in which the hydroxyl group is stearically hindered, of a precursor whose composition corresponds to the formula:

$$TiCl_3 \cdot (AlRCl_2)_x \cdot C_y$$

where R is an alkyl radical containing from 2 to 6 carbon atoms, C is an electron-donor compound such as defined above, x is any number smaller than 0.20 and y is any number larger than 0.009 and generally smaller than 0.20.

10. The suspension according to claim 9, wherein the particles are subjected to a prepolymerization treatment at any time during their preparation by contacting them with a lower alpha-monoolefin under polymerizing conditions to obtain particles containing from about 5 to about 500% by weight of prepolymerized alpha-monoolefin.

11. The suspension according to claim 7, wherein the suspension has a total weight, and wherein the particles represent from about 20 to about 70% of the total weight of the suspension.

12. The suspension according to claim 7, wherein the suspension has a total weight, and wherein the particles represent from about 25 to about 50% of the total weight of the suspension.

13. The suspension according to claim 7, wherein the oil has a kinematic viscosity (25° C.) ranging between about 0.5 to about 30,000 cSt.

* * * * *